United States Patent [19]

Gacer

[11] 4,385,034

[45] May 24, 1983

[54] APPARATUS FOR DISSOLVING AND DISPENSING SOLUBLE COMPOUNDS

[76] Inventor: Richard H. Gacer, 2932 Plymouth Rd., Stockton, Calif. 95204

[21] Appl. No.: 308,233

[22] Filed: Oct. 2, 1981

[51] Int. Cl.³ .................... B01D 11/02; B01D 12/00
[52] U.S. Cl. ..................... 422/278; 137/268; 239/310; 239/317; 422/261
[58] Field of Search ............ 422/261, 277, 278, 283; 137/268; 239/310, 317; 222/168, 169, 168.5, 526

[56] References Cited

U.S. PATENT DOCUMENTS

| | | | |
|---|---|---|---|
| 2,758,877 | 8/1956 | Gleason | 422/278 |
| 2,989,979 | 6/1961 | Karlson | 422/261 |
| 3,439,698 | 4/1969 | De May | 137/268 |
| 3,864,090 | 2/1975 | Richards | 422/278 |
| 4,026,673 | 5/1977 | Russo | 422/278 |

*Primary Examiner*—Richard L. Chiesa
*Attorney, Agent, or Firm*—Harris Zimmerman; Howard Cohen

[57] ABSTRACT

A device for dissolving and dispensing soluble compounds includes a base having a flow channel therethrough, and a housing secured to the base having a mixing chamber therein. The mixing chamber is adapted to contain dry solutes, and an open container within the chamber is adapted to hold liquid solutes. Water is admitted to the chamber from the flow channel, the water diffusing through a perforated dome member to mix with the dry solutes. A delivery tube extends from the dome member to the container to direct a jet of water therein for dissolving heavy liquid solutes. An outlet port extends from the chamber to the flow channel adjacent to the outlet end thereof, so that solutions formed within the chamber may be drawn into and mixed with the water moving through the flow channel.

3 Claims, 4 Drawing Figures

U.S. Patent     May 24, 1983     4,385,034
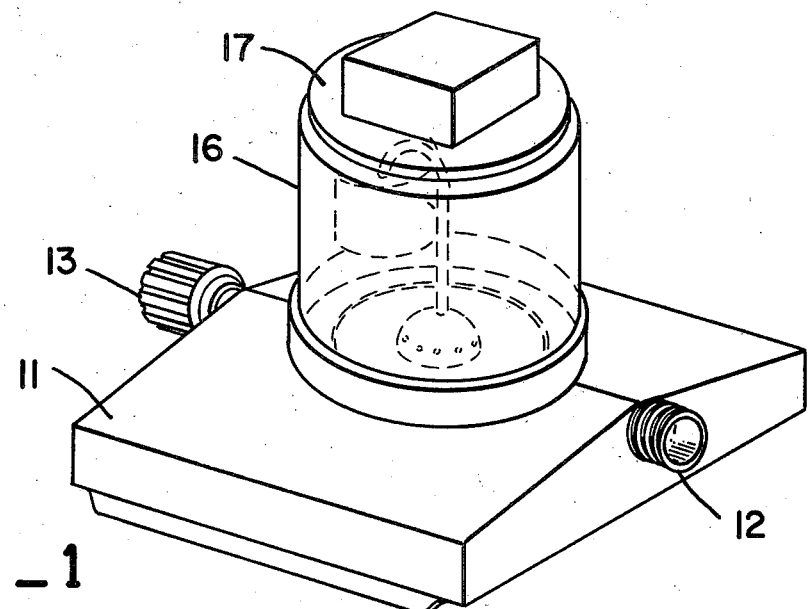
FIG_1
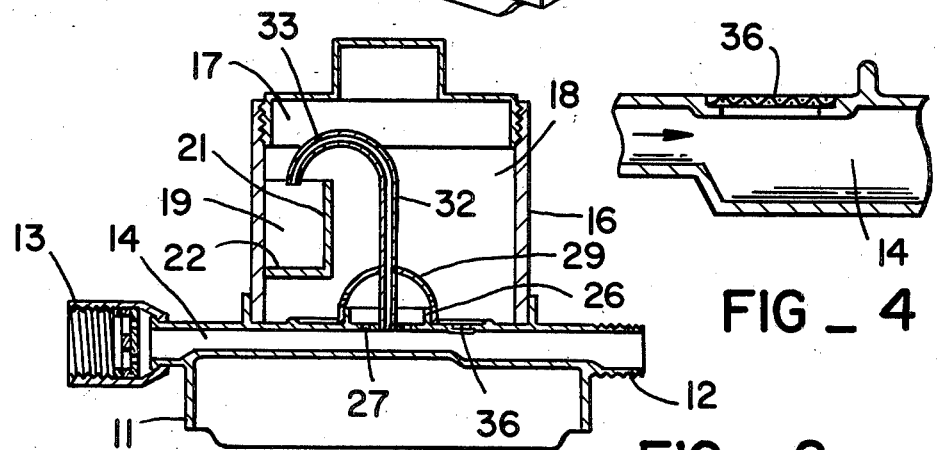
FIG_2
FIG_4
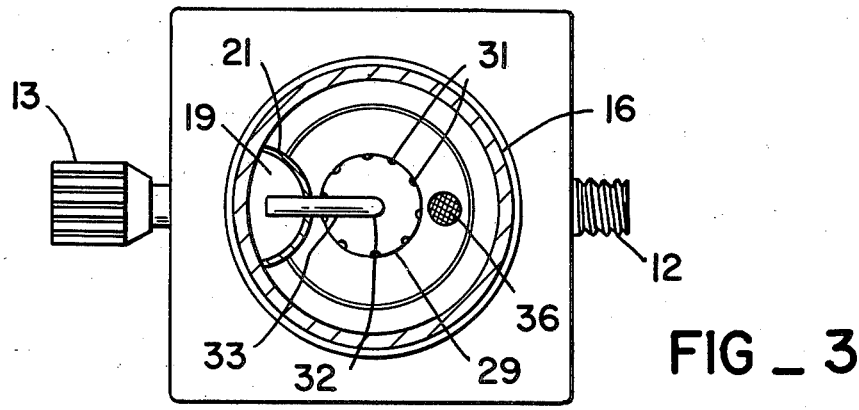
FIG_3

APPARATUS FOR DISSOLVING AND DISPENSING SOLUBLE COMPOUNDS

BACKGROUND OF THE INVENTION

The following U.S. patents comprise the most pertinent known prior art:
U.S. Pat. No. 3,260,464
U.S. Pat. No. 3,618,539
U.S. Pat. No. 804,378
U.S. Pat. No. 3,864,090
U.S. Pat. No. 3,901,262
U.S. Pat. No. 3,933,308
U.S. Pat. No. 4,249,562
U.S. Pat. No. 1,757,140

It is generally well known in the prior art to provide devices which attach to water delivery systems for adding desirable compounds to the water which passes through the system. Such desirable compounds may include fertilizer, pesticide, detergents, and other cleaning agents, or the like.

These prior art devices typically employ a chamber which is connected to a pipe or other flow channel through which the liquid is delivered. The chamber is adapted to contain the compound to be added to the water, and a small orifice connects the chamber to the flow channel to divert a small portion of the fluid stream into the chamber to dissolve the compound therein. The resulting mixture is then aspirated from the chamber through an outlet orifice which also communicates with the flow channel.

A general problem encountered in conjunction with devices as described in the foregoing is that the compounds placed in the chamber are often not readily dissolved by the water flow that enters the chamber. This may be due to the fact that many substances do not easily dissolve in water, or that the water entering the chamber does not provide sufficient agitation of the substance therein to achieve complete dissolution thereof. As a result, the amount of solute which mixes with the fluid stream in the flow channel may be less than anticipated, and the concentration of the solute may vary considerably as the substance is discharged. It is well known that uneven applications of such substances as fertilizer or pesticide can cause detrimental effects.

SUMMARY OF THE PRESENT INVENTION

The present invention generally comprises a device for dissolving and dispensing soluble compounds. The invention includes a base having a flow channel therethrough, and a housing secured to the base with a mixing chamber disposed therein. The mixing chamber is adapted to contain dry solutes, and an open container within the chamber is adapted to hold liquid solutes or other substances which are not readily dissolved in water. Water is admitted to the chamber by diversion from the flow channel, the water diffusing through a perforated dome member to mix with the dry solutes. A delivery tube extends from the dome member to the container to direct a jet of water therein for dissolving heavy liquid solutes and the like. An output port extends from the chamber to the flow channel adjacent to the outlet end thereof, so that solutions formed within the chamber may be drawn into and mixed with the water moving through the flow channel. The device permits the dissolving and dispensing of a wider range of soluble and semi-soluble substances than devices known in the prior art.

BRIEF DESCRIPTION OF THE DRAWING

FIG. 1 is a perspective view of the device of the present invention.
FIG. 2 is a cross-sectional side elevation of the device as shown in FIG. 1.
FIG. 3 is a partially cut-away top view of the device shown in FIGS. 1 and 2.
FIG. 4 is an enlarged cross-sectional detail of the outlet port of the device of the present invention.

DESCRIPTION OF THE PREFERRED EMBODIMENT

The present invention generally comprises a device for dissolving and dispensing soluble substances in a stream of water. With reference to FIGS. 1-3, the device includes a generally rectangular base member 11 having a male hose coupling 12 at one end and a female hose coupling 13 at the other end. Extending between the couplings 12 and 13 is a liquid flow channel 14 which is disposed within the base 11.

Secured to the upper surface of the base member 11 is a generally cylindrical housing 16. The upper end of the housing is open, and is provided with internal threads to removeably secure a threaded disc top 17. The housing 16 and the top 17 define an enclosed chamber 18. Disposed within the chamber 18 and secured to the inner surface of the housing 16 is a container 19 defined by an arcuate side wall 21 joined at each end to the housing 16, and a bottom wall 22 extending from the lower edge of the wall 21 to the housing. The container 19 is open at the upper end thereof.

Extending upwardly from the upper surface of the housing 11 and disposed concentrically with respect to the axis of the housing 16 is a cylindrical collar 26, as shown in FIG. 2. Within the perimeter of the collar 26 a plurality of inlet ports 27 extend from the flow channel 14 into the chamber 18. A dome member 29 is secured about the periphery of the collar 26, and is provided with a plurality of diffusing holes 31 spaced thereabout. It may be appreciated that water under pressure passes from the flow channel 14 through the inlet ports 27, and is thence diffused through the holes 31 of the dome member 29 to mix with soluble compounds placed within the chamber 18. The rate of flow of water through the holes 31 is sufficient to dissolve most powdered or crystalline compounds such as fertilizer, detergent, or the like.

A salient feature of the present invention is the provision of a delivery tube 32 which extends upwardly from the housing within the chamber 18. The delivery tube 32 is preferably colinear with the axis of the housing 16, and is pivotally supported at its lower end within the housing 11. The lower end of the delivery tube is in open flow communication with the flow channel 14, while the upper end of the tube 32 is provided with a goose-neck portion 33 defining an arc of approximately 180°. The delivery tube 32 is adapted to receive pressurized water from the flow channel 14, and to emit a jet of water into the container 19.

It may be appreciated that those substances which are not readily soluble may be disposed within the container 19 for dissolution and dispersal. The water jet provided by the delivery tube 32 provides sufficient velocity and agitation to dissolve compounds such as viscous liquid detergents, petroleum based compounds, and the like. These compounds would not otherwise be soluble in the liquid flow provided by the diffusing holes 31, nor would they be soluble in prior art devices which do not include a jet delivery tube.

With references to FIGS. 2-4, the invention also includes an outlet port 36 disposed within the perimeter of the housing 16 and extending between the flow channel 14 and the chamber 18. As shown in FIG. 4, the outlet port 36 is disposed directly adjacent to and slightly downstream from a restricted flow portion of the channel 14. As is well known in the prior art, the reduced fluid pressure at that point draws liquid from the chamber 18 through the port 36 and into the stream passing through the channel 14. Thus the liquid in the chamber 18, which includes the dissolved substances therein, is mixed with the fluid stream and discharged through a hose or other device connected to the coupling 12. The port 36 is provided with a screen filter to block the passage of large undissolved particles and the like.

It may be appreciated that the delivery tube 32 may be pivotted about its major axis to direct the jet emanating from the upper end thereof into the container 19, as desired. If less soluble substances are not to be used with the present invention, the container 19 need not be used, due to the fact that dissolution of the substances will be effected by the outflow from the holes 31. In that case, the tube 33 may be rotated so that the jet therefrom will be directed into the main portion of the chamber 18 and not into the container 19.

I claim:

1. A device for dissolving and dispensing soluble and semi-soluble substances, comprising; a base member having a flow channel extending therethrough and adapted to carry a fluid stream passing therethrough, a chamber disposed adjacent to said flow channel, inlet port means extending from said flow channel to said chamber to divert a portion of the fluid stream into said chamber, diffuser means connected to said inlet port means within said chamber for diffusing said fluid in said chamber, fluid jet means connected to said flow channel for delivering a fluid jet into said chamber to dissolve semi-soluble substances therein, outlet port means extending between said chamber and said flow channel for aspirating solutions formed in said chamber into said fluid stream in said flow channel, said diffuser means including a dome-shaped member including a plurality of emitter holes spaced about the periphery thereof, said jet means including a delivery tube extending from said flow channel through said dome member into said chamber.

2. The device of claim 1, wherein said delivery tube includes a goose-neck portion within said chamber for directing said fluid jet.

3. A device for dissolving and dispensing soluble and semi-soluble substances, comprising; a base member having a flow channel extending therethrough and adapted to carry a fluid stream passing therethrough, a chamber disposed adjacent to said flow channel, inlet port means connected to said inlet port means within said chamber for diffusing said fluid in said chamber, fluid jet means connected to said flow channel for delivering a fluid jet into said chamber to dissolve semi-soluble substances therein, outlet port means extending between said chamber and said flow channel for aspirating solutions formed in said chamber into said fluid stream in said flow channel, a container disposed in said chamber for holding said semi-soluble substances, said jet means including a delivery tube having a proximal end in flow communication with said flow channel and a distal end discharging in said chamber, said delivering tube being rotatable to selectively direct said fluid jet into said container or into said chamber.

* * * * *